(12) United States Patent
Blunier et al.

(10) Patent No.: US 8,794,344 B2
(45) Date of Patent: Aug. 5, 2014

(54) DOWN PRESSURE CONTROL SYSTEM FOR AN AGRICULTURAL IMPLEMENT

(75) Inventors: Timothy R. Blunier, Danvers, IL (US); Jessica Haynes, West Bend, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/605,064

(22) Filed: Sep. 6, 2012

(65) Prior Publication Data
US 2014/0060869 A1 Mar. 6, 2014

(51) Int. Cl.
*A01D 59/00* (2006.01)
*A01D 69/00* (2006.01)

(52) U.S. Cl.
USPC .......................................... 172/326; 111/200

(58) Field of Classification Search
USPC ........... 111/200, 14, 192, 193, 194, 149, 900; 172/4, 315, 326; 700/282, 231
See application file for complete search history.

(56) References Cited

U.S. PATENT DOCUMENTS

| | | | | |
|---|---|---|---|---|
| 3,749,035 | A * | 7/1973 | Cayton et al. | 111/187 |
| 4,176,721 | A * | 12/1979 | Poggemiller et al. | 172/4 |
| 4,700,784 | A | 10/1987 | Wiebe et al. | |
| 5,524,560 | A * | 6/1996 | Carter | 111/200 |
| 5,687,798 | A | 11/1997 | Henry et al. | |
| 5,715,893 | A | 2/1998 | Houck | |
| 5,727,638 | A * | 3/1998 | Wodrich et al. | 172/414 |
| 6,068,064 | A * | 5/2000 | Bettin et al. | 172/413 |
| 6,216,794 | B1 * | 4/2001 | Buchl | 172/4 |
| 6,318,477 | B1 | 11/2001 | Bettin | |
| 6,389,999 | B1 * | 5/2002 | Duello | 111/200 |
| 6,454,019 | B1 * | 9/2002 | Prairie et al. | 172/677 |
| 6,460,623 | B1 * | 10/2002 | Knussman et al. | 172/4 |
| 6,675,907 | B2 | 1/2004 | Moser et al. | |
| 6,701,857 | B1 * | 3/2004 | Jensen et al. | 111/200 |
| 6,827,029 | B1 * | 12/2004 | Wendte | 111/185 |
| 7,308,859 | B2 * | 12/2007 | Wendte et al. | 111/164 |
| 7,549,482 | B2 | 6/2009 | Wake et al. | |
| 7,866,132 | B2 | 1/2011 | Killen et al. | |
| 7,918,285 | B1 | 4/2011 | Graham et al. | |
| 7,938,074 | B2 * | 5/2011 | Liu | 111/200 |
| 7,971,417 | B2 | 7/2011 | Link | |
| 8,176,992 | B2 * | 5/2012 | Yuen | 172/452 |
| 8,448,717 | B2 * | 5/2013 | Adams et al. | 172/4 |
| 8,522,889 | B2 * | 9/2013 | Adams et al. | 172/4 |
| 2007/0235203 | A1 | 10/2007 | Bergstrom et al. | |
| 2008/0093093 | A1 * | 4/2008 | Sheppard et al. | 172/2 |
| 2011/0284252 | A1 * | 11/2011 | Friggstad et al. | 172/310 |
| 2011/0290514 | A1 | 12/2011 | Yuen | |
| 2011/0290515 | A1 | 12/2011 | Yuen | |
| 2011/0313575 | A1 * | 12/2011 | Kowalchuk et al. | 700/282 |
| 2012/0232691 | A1 * | 9/2012 | Green et al. | 700/231 |
| 2013/0032362 | A1 * | 2/2013 | Rylander | 172/1 |
| 2013/0032363 | A1 * | 2/2013 | Curry et al. | 172/4 |
| 2013/0104785 | A1 * | 5/2013 | Achen et al. | 111/157 |
| 2013/0112121 | A1 * | 5/2013 | Achen et al. | 111/14 |

* cited by examiner

*Primary Examiner* — Árpád Fábián-Kovács
(74) *Attorney, Agent, or Firm* — Rebecca L. Henkel

(57) ABSTRACT

An agricultural implement system, including a center toolbar including at least one ground engaging tool, a first inner-wing toolbar rotatably coupled to the center toolbar, the first inner-wing toolbar including at least one ground engaging tool, a first outer-wing toolbar rotatably coupled to the first inner-wing toolbar, the first outer-wing toolbar including at least one ground engaging tool, a first actuating cylinder coupled to the center toolbar, a second actuating cylinder extending between the center toolbar and the first inner-wing toolbar, a third actuating cylinder extending between the first inner-wing toolbar and the first outer-wing toolbar, and a control system configured to drive the first actuating cylinder, the second actuating cylinder, and the third actuating cylinder.

20 Claims, 4 Drawing Sheets

DOWN PRESSURE CONTROL SYSTEM FOR AN AGRICULTURAL IMPLEMENT

BACKGROUND

The invention relates generally to ground working equipment, such as agricultural equipment, and more specifically, to a down pressure control system for an agricultural implement.

Generally, fertilizer application implements are towed behind a tractor or other work vehicle via a hitch assembly secured to a rigid frame of the implement. Certain fertilizer application implements include a storage tank configured to hold fluid fertilizer, and to provide the fluid fertilizer to injection nozzles. The storage tank is supported by a frame, which may also support a toolbar assembly having openers and the injection nozzles (e.g., as elements of respective row units mounted to the toolbar assembly). The openers form a path for fertilizer deposition into the soil. Specifically, the openers are used to break the soil, thereby enabling the injection nozzles (e.g., positioned behind the openers) to deposit fertilizer at a desired depth beneath the soil surface. In certain embodiments, the implement may include knives (e.g., positioned behind the openers), instead of the injection nozzles, to flow the liquid fertilizer into respective trenches formed by the openers and the knives. Using such implements, fertilizer may be distributed throughout a field, either before or after planting, to facilitate enhanced crop development. Unfortunately, the openers may over-penetrate or under-penetrate the soil because of variations in soil density, terrain slope, and weight distribution across the toolbar assembly. Under-penetration or over-penetration may cause fertilizer to be deposited at an undesirable depth, thereby reducing fertilizer efficiency.

BRIEF DESCRIPTION

In a first embodiment, an agricultural implement system, including a center toolbar including at least one ground engaging tool, a first inner-wing toolbar rotatably coupled to the center toolbar, the first inner-wing toolbar including at least one ground engaging tool, a first outer-wing toolbar rotatably coupled to the first inner-wing toolbar, the first outer-wing toolbar including at least one ground engaging tool, and a first actuating cylinder coupled to the center toolbar, wherein the first actuating cylinder is configured to apply a first down force to the center toolbar to drive the at least one ground engaging tool of the center toolbar to penetrate soil, a second actuating cylinder extending between the center toolbar and the first inner-wing toolbar, wherein the second actuating cylinder is configured to apply a second down force to the first inner-wing toolbar to drive the at least one ground engaging tool of the first inner-wing toolbar to penetrate the soil, a third actuating cylinder extending between the first inner-wing toolbar and the first outer-wing toolbar, wherein the third actuating cylinder is configured to apply a third down force to the first outer-wing toolbar to drive the at least one ground engaging tool of the first outer-wing toolbar to penetrate the soil, and a control system configured to drive the first actuating cylinder, the second actuating cylinder, and the third actuating cylinder, such that the first down force is greater than the second down force, and the second down force is greater than the first down force.

In a second embodiment, an agricultural implement system, including a frame, a storage tank connected to the frame, and configured to store a material, a center toolbar connected to the frame, the center toolbar including at least one opener, a first inner-wing toolbar and a second inner-wing toolbar pivotably connected to opposite ends of the center toolbar, and wherein the first and second inner-wing toolbars include at least one opener, a first outer-wing toolbar and a second outer-wing toolbar pivotably connected to the respective first and second inner-wing toolbars, and wherein the first and second inner-wing toolbars include at least one opener, and a first actuating cylinder, a second actuating cylinder, a third actuating cylinder, a fourth actuating cylinder, and a fifth actuating cylinder configured to apply a down force on the respective center toolbar, first inner-wing toolbar, second inner-wing toolbar, first outer-wing toolbar, and second outer-wing toolbar to drive the openers to penetrate the soil with substantially equal contact forces.

In a third embodiment, an agricultural implement system, including a center toolbar with at least one opener, a first inner-wing toolbar and a second inner-wing toolbar pivotably connected to opposite ends of the center toolbar, and wherein the first and second inner-wing toolbars include at least one opener, a first outer-wing toolbar and a second outer-wing toolbar pivotably connected to the respective first and second inner-wing toolbars, and wherein the first and second outer-wing toolbars include at least one opener, and a first actuating cylinder, a second actuating cylinder, a third actuating cylinder, a fourth actuating cylinder, and a fifth actuating cylinder configured to apply an adjustable down force on the respective center toolbar, first inner-wing toolbar, second inner-wing toolbar, first outer-wing toolbar, and second outer-wing toolbar to drive the openers into the soil, and a fluid control circuit configured to control a downward force on the center toolbar, first inner-wing toolbar, second inner-wing toolbar, first outer-wing toolbar, and second outer-wing toolbar so that the openers penetrate the soil with substantially equal contact forces.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
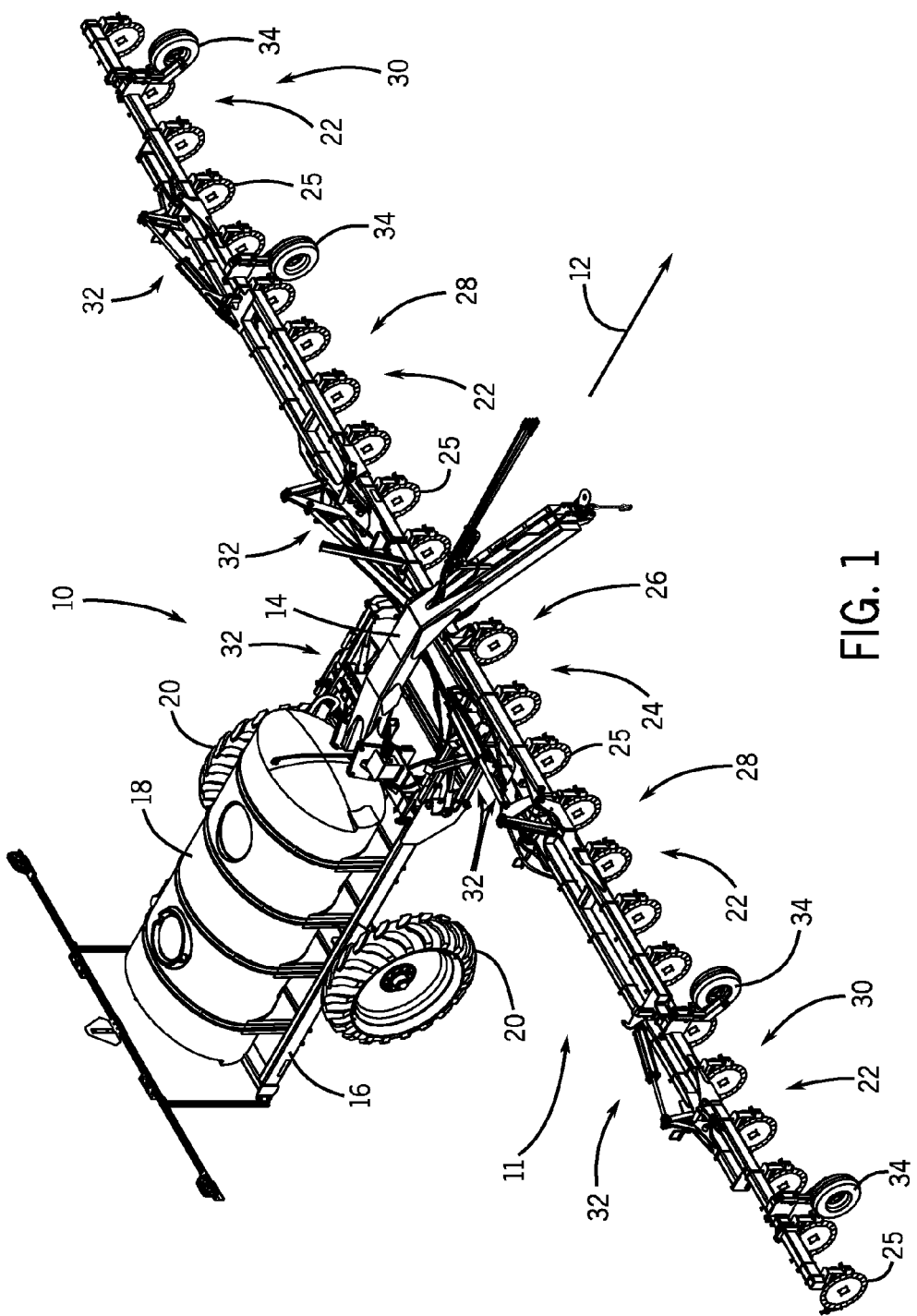
FIG. 1 is a perspective view of an embodiment of an agricultural implement having a down pressure control system.

FIG. 1 is a perspective view of an embodiment of an agricultural implement 10 having a down pressure control system 11 configured to facilitate proper penetration depth of ground engaging tools. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" pull frame. As illustrated, the hitch assembly 14 is coupled to a main frame assembly 16 of the implement 10 to facilitate towing of the implement 10 in the direction of travel 12. In the illustrated embodiment, the frame assembly 16 supports a storage tank 18 configured to house a flowable agricultural product, such as liquid fertilizer. A pair of wheels 20 coupled to the frame assembly 16 are configured to support the weight of the frame assembly 16, the storage tank 18, and the flowable agricultural product, thereby enabling the implement 10 to be towed across the field.

The implement 10 is configured to transfer the flowable agricultural product from the storage tank 18 to multiple row units 22 of a toolbar assembly 24. Each row unit 22 includes a ground engaging tool 25 (e.g., an opener) configured to break the soil, thereby excavating a trench into the soil. An injection nozzle or knife (e.g., positioned behind the ground engaging tool) is configured to deposit flowable agricultural product from the storage tank 18 into the trench formed by the ground engaging tool. The depth control system 11 maintains a penetration depth of the ground engaging tools to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 24 row units 22, it should be appreciated that alternative implements may include more or fewer row units 22. In addition, the number of row units and the spacing between row units may be particularly selected to correspond to the arrangement of row units on respective seeding or planting implements. For example, the implement 10 may include 24 row units 22 spaced 30 inches from one another. Accordingly, as the implement 10 is towed across a field, the row units 22 deposit fertilizer in rows having 30-inch spacing. After the fertilizer is applied, a seeding or planting implement having row units configured to deposit seeds into the soil at 30-inch spacing is aligned with the rows of fertilizer. As the seeding or planting implement moves across the field, seeds are placed into contact with the previously applied fertilizer, thereby facilitating enhanced crop development. In addition, the implement 10 may be utilized to apply fertilizer to previously planted seeds (e.g., via aligning the row units 22 with the rows of seeds).

As illustrated, the toolbar assembly 24 includes multiple toolbars. In the present embodiment, the toolbar assembly 24 includes a center toolbar 26, inner-wing toolbars 28, and outer-wing toolbars 30. As illustrated, the inner-wing toolbars 28 rotatably couple to the center toolbar 26, while the outer-wing toolbars 30 rotatably couple to the inner-wing toolbars 28. The toolbars 26, 28, and 30 include respective row units 22 configured to break the soil and to deposit the agricultural product into the soil.

As mentioned above, the depth control system 11 maintains the openers 25 on the toolbar assembly 24 at a desired depth. More specifically, the depth control system 11 controls each toolbar of the toolbar assembly 24, thus customizing the response across the entire toolbar assembly 24 to changes in the soil density and terrain slope. The depth control system 11 includes multiple actuating cylinders 32, gauge wheels 34, fluid lines, and valves for controlling movement of the toolbars 26, 28, and 30. As illustrated, there are six actuating cylinders 32, two that control movement of the center toolbar 26, one for each of the inner-wing toolbars 28, and one for each of the outer-wing toolbars 30. While six actuating cylinders 32 are included in the illustrated embodiment, other embodiments may include different numbers of actuating cylinders 32 (e.g., 5, 6, 7, 8, 9, 10, or more). Moreover, the implement 10 includes four gauge wheels 34, but other configurations may include different numbers of gauge wheels 34 (e.g., 2, 3, 4, 5, 10 or more). Together, the actuator cylinders 32 and gauge wheels 34 operate to establish proper penetration depth of the openers 25 in the row units 22. Specifically, the cylinders 32 provide sufficient down force to maintain contact between the gauge wheels 34 and the soil surface. The gauge wheels 34, when in contact with the soil, provide an upward force to counter the downward force from the actuating cylinders 32, preventing the openers 25 from over-penetrating the soil.

Figure 2:
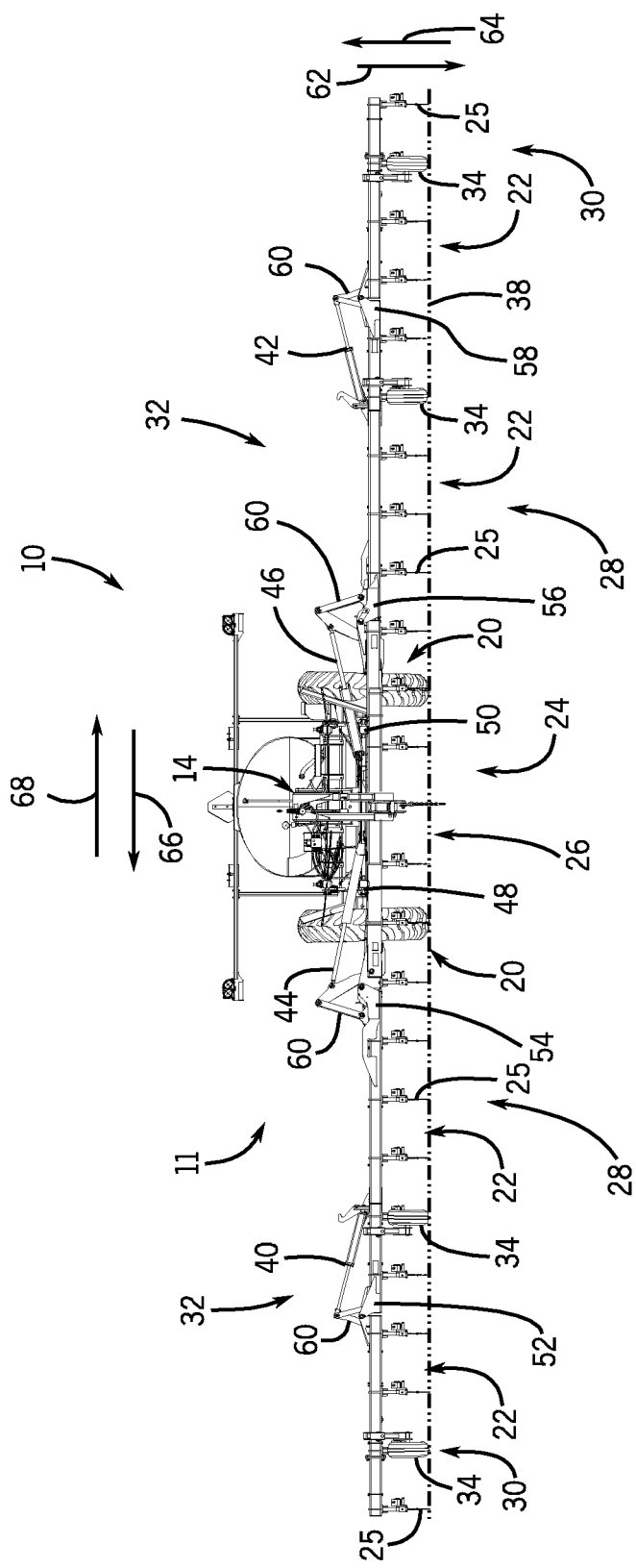
FIG. 2 is a front view of the agricultural implement of FIG. 1 on a flat surface.

FIG. 2 is a front view of the agricultural implement 10 of FIG. 1 on a flat surface 38 (e.g., a field). As explained above, the down pressure control system 11 enables different down pressures to be applied to each toolbar of the toolbar assembly 24. The actuating cylinders 40 and 42 provide the adjustable force on the outer-wing toolbars 30, the actuating cylinders 44 and 46 provide the adjustable force on the inner-wing toolbars 28, and the actuating cylinders 48 and 50 provide the adjustable force on the center toolbar 26. The toolbars of the toolbar assembly 24 rotatably couple to each other with connections 52, 54, 56 and 58. The rotatable connections 52, 54, 56 and 58 enable the actuating cylinders 32 to individually urge the inner-wing toolbars 28 and the outer-wing toolbars 30 downwardly toward the soil surface. The actuating cylinders 32 transfer the force to the toolbar through scissor linkages 60. The scissor linkages 60 provide a connection point for the cylinders 32, thereby enabling the cylinders to transmit force to the toolbars to drive the toolbars downwardly about their respective connections 52, 54, 56 and 58.

In the present embodiment, urging the toolbars of the toolbar assembly 24 in a downward direction 62 increases downward force on the openers 25 and gauge wheels 34. While rotation of the toolbars of the toolbar assembly 24 in an upward direction 64 reduces the downward force on the openers 25 and gauge wheels 34. For example, as the actuating cylinders 40 and 44 extend the in direction 66, the cylinders 32 provide a force in direction 66. The force in the direction 66 urges the toolbars 28 and 30 on the left hand side of the implement 10 downwardly about the respective connections 52 and 54. Thus increasing the downward force on the openers 25 and gauge wheels 34. The gauge wheels 34 provide a sufficient counter force in direction 64 to maintain the openers at a desired penetration depth. As the gauge wheels 34 counter the force in the direction 62, the gauge wheels block the openers 25 from over penetrating into the soil. Accordingly, the actuating cylinders 32 and the gauge wheels 34 establish a proper depth penetration, without over penetrating the openers 25. When the down pressure control system 11 decreases downward pressure, the system reverses the process. Specifically, the actuating cylinder 40 and 44 are allowed to contract. As they contract in direction 68 the cylinders 40 and 44 create a pulling force on the linkages 60. The pulling force on the linkages 60 cause the toolbars 28 and 30 on the left hand side of the implement 10 to rotate about their respective connections 52 and 54. The rotation around the connections 52 and 54 decreases the downward force on the gauge wheels 34 and openers 25. While only the left hand side of the implement 10 was discussed above, the right hand side of the implement 10 operates in the same manner.

Figure 3:
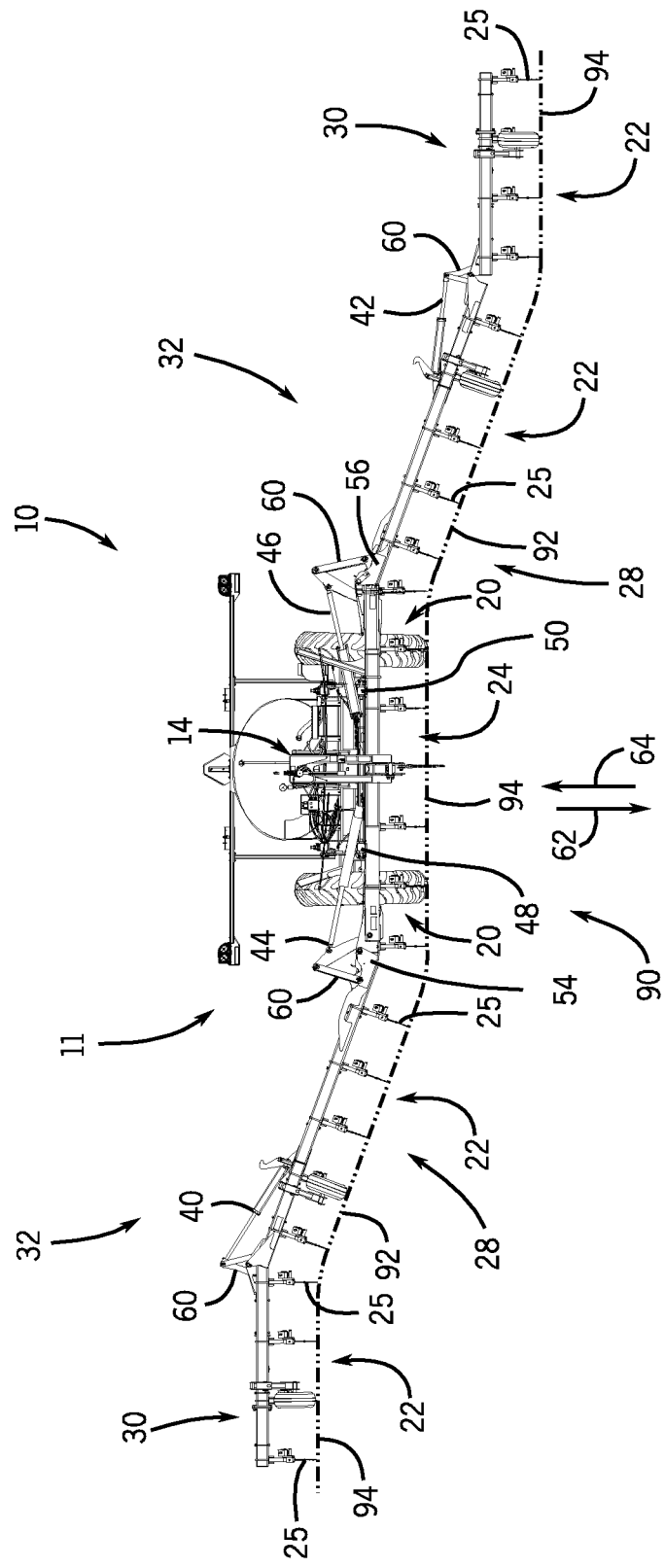
FIG. 3 is a front view of the agricultural implement of FIG. 1 on a terraced surface.

FIG. 3 is a front view of the agricultural implement 10 of FIG. 1 on a terraced surface 90. As explained above, the actuating cylinders 32 apply a downward force to the toolbars, thereby enabling the gauge wheels 34 to establish a proper penetration of the openers 25 despite varying soil conditions and terrain slopes. As illustrated in FIG. 3, the implement 10 may operate on a terraced surface 90. Despite the variations in terrain, the implement 10 maintains the openers at the proper depth. The implement 10 uses the down pressure control system 11 to vary the downward force applied to the different toolbars of the toolbar assembly 24, thereby ensuring proper penetration by the openers 25. For example, in FIG. 3, the openers 25 of the inner-wing toolbars 28 engage angled surfaces 92. The angled surfaces 92 reduce contact force between the openers and the ground due to the weight of the toolbar the dead weight of the inner-wing toolbars 28, and therefore the force on the openers 25. In response, the down pressure control system 11 uses the actuating cylinders 40 and 46 to provide additional downward force. Specifically, the cylinders 40 and 46 urge the inner-wing toolbars 28 downwardly around the connections 54 and 56 in direction 62. Accordingly the inner-wing toolbars 28 drive the openers 25 into the soil until the gauge wheels 34 resist additional downward movement. As a result, the openers 25 reach the proper soil penetration depth on the angled field surfaces 92.

Moreover, as illustrated the openers of, the center toolbar 26 and the outer-wing toolbars 30 engage flat surfaces 94. Accordingly, the down control pressure system 11 may actuate cylinders 44 and 46 more than cylinders 40, 42, 48, and 50 in order for openers 25 on the inner-wing toolbars 28 to penetrate the soil to the proper depth. While FIG. 3 illustrates one possible terrain for the toolbars of the tool bar assembly 24, the implement may encounter many more surface slopes, including having the entire implement 10 on an angled surface. For example, one or both of the outer-wing toolbars 30 may be on an angled surface. Accordingly, the cylinder 40 and/or 42 may provide sufficient down force to facilitate engagement of the openers 25 at a desired penetration depth despite the variation in field slope. In still another embodiment, the center tool bar 24 may be on a flat surface while both the inner and outer-wing toolbars 28 and 30 may be on angled surfaces. Accordingly, the cylinders 40, 42, 44, and 46 may provide sufficient down force to facilitate engagement of the openers at a desired penetration depth despite the variation in field slope. Additional embodiments may have only one side of the implement 10 on an angled surface. Accordingly, the cylinders on that particular side may provide sufficient down force to facilitate engagement of the openers 25 at a desired penetration depth despite the variation in field slope. Accordingly, as explained above, the down pressure control system 11 may provide sufficient down pressure on toolbars of the toolbar assembly 24 to drive the openers 25 into the soil at a proper soil penetration depth.

Figure 4:
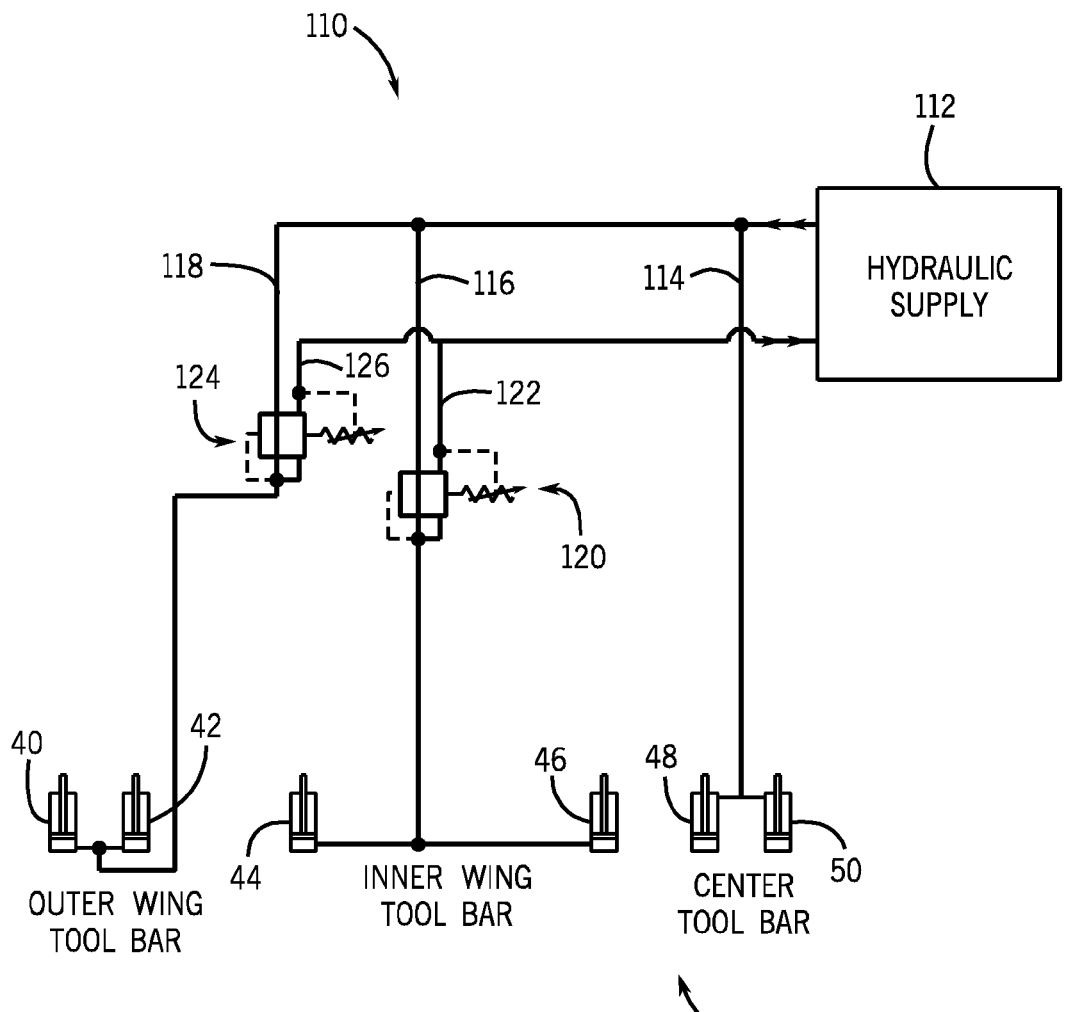
FIG. 4 is a schematic view of an embodiment of a flow control circuit for a down pressure control system.

FIG. 4 is a schematic view of an embodiment of a flow control circuit 110 for the down pressure control system 11. The flow control circuit 110 enables the down pressure control system 11 to establish a desired down pressure on the individual toolbars of the toolbar assembly 24. More specifically, the down pressure control system 11 may tailor the force applied by each of the toolbars in the toolbar assembly 24. As a result, the down pressure control system 11 may increase the force on toolbars with more openers (i.e., so that all openers penetrate the soil to the desired depth). For example, the center tool bar may have more openers than the inner-wing toolbars, and the inner-wing toolbars may have more openers than the outer-wing toolbars. The down pressure control system 11 may therefore supply more down pressure to the center toolbar than the inner-wing toolbars, and more down pressure to the inner-wing toolbars than the outer-wing toolbars, in order to force all of the openers on the implement 10 to a desired depth in the soil.

The flow control circuit 110 may use any suitable fluid (e.g., air, liquid) in order to actuate the cylinders 32. However, in the present embodiment, the flow control circuit 110 operates with hydraulic fluid. In operation, the flow control circuit 110 receives hydraulic fluid from a supply (e.g., a tractor or other farm tool). The hydraulic fluid from the supply 112 flows through a series of hydraulic lines 114, 116, and 118 to the actuators 32. Specifically, hydraulic line 114 delivers hydraulic fluid to actuator cylinders 48 and 50 that control the center toolbar 26; hydraulic line 116 delivers to actuator cylinders 44 and 46 that control the inner-wing toolbars 28; and line 118 delivers to actuator cylinders 40 and 42 that control the outer-wing toolbars 30.

As illustrated, the actuator cylinders 48 and 50 receive hydraulic pressure through line 114. The hydraulic pressure in line 114 may be the same as the supply pressure. The pressure in the hydraulic supply 112 may be between 2000-3000 psi. The actuator cylinders 48 and 50 may operate at this pressure to drive the openers 25 of the center toolbar into the soil, and to provide a platform for other cylinders to drive the openings of their respective wing toolbar into the soil. In operation, pressurized hydraulic fluid flowing through line 114 urges the actuators 48 and 50 to contract, thereby providing additional down pressure to the center tool bar that drives the openers on the center toolbar 26 to the proper depth in the soil.

As explained above, the line 116 supplies pressurized hydraulic fluid to the actuator cylinders 44 and 46. As illustrated, the hydraulic fluid flowing through line 116 passes through a pressure reducing relieving valve 120. The pressure reducing relieving valve 120 reduces the hydraulic pressure of the fluid from the supply 112 to a desired pressure for the actuators 44 and 46 (e.g., 150-800 psi). The pressure reducing relieving valve 120 may be adjusted to the desired pressure (i.e., a pressure sufficient to drive the openers to engage the soil without substantially compacting the soil with the gauge wheels). The excess pressurized fluid is relieved from the valve 120 through hydraulic fluid line 122, which flows the fluid back to the supply 112. Accordingly, the valve 120 units pressure to the actuator cylinders 44 and 46. The pressurized hydraulic fluid flows through the valve 120 and into the actuators 44 and 46, driving the actuators to extend. The extension of the actuators 44 and 46 provides additional down pressure on the inner-wing toolbars 28, thereby driving the openers 25 into the soil until the gauge wheels 34 resist additional downward movement. As explained, excessive force may drive the gauge wheels into the soil, and thus the openers 25 to the wrong depth. Accordingly, the pressure reducing relieving valve 120 may adjustably enable sufficient down force to be applied to the openers to penetrate the soil, but not over-penetrate.

Line 118 supplies hydraulic fluid to the actuators 40 and 42. The hydraulic fluid flowing through line 118 passes through pressure reducing relieving valve 124. The pressure reducing relieving valve 124 reduces the hydraulic pressure of the fluid from the supply 112 to a desired pressure for the actuators 40 and 42. The desired pressure for the actuators 40 and 42 may be the same as or differ from the pressure supplied to the inner-wing toolbars 28 through the actuators 44 and 46 or the center toolbar through the actuators 48 and 50 (e.g., 150-800 psi). The excess pressurized fluid is relieved from the valve 124 through hydraulic fluid line 126, which flows the fluid back to the supply 112. Accordingly, the valve 124 limits pressure from traveling through the lines 118 to the actuators 40 and 42. The pressurized hydraulic fluid flows through the valve 124 and into the actuators 40 and 42, driving the actuators to extend. The extension of the actuators 40 and 42 provides additional down pressure on the outer-wing toolbars 30, driving the openers 25 to the proper depth in the soil. The pressure reducing relieving valve 124 prevents the actuators 40 and 42 from creating excess down force on the outer-wing toolbars 30. As explained, excessive force may drive the gauge wheels 34 into the soil and thus the openers 25 to the wrong depth. Accordingly, the pressure reducing relieving valve 124 may adjustably enable sufficient down force to be applied to the openers to penetrate the soil, but not over-penetrate.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
a center toolbar including at least one ground engaging tool;
a first inner-wing toolbar rotatably coupled to the center toolbar, the first inner-wing toolbar including at least one ground engaging tool;
a first outer-wing toolbar rotatably coupled to the first inner-wing toolbar, the first outer-wing toolbar including at least one ground engaging tool;
a first actuating cylinder coupled to the center toolbar, wherein the first actuating cylinder is configured to apply a first down force to the center toolbar to drive the at least one ground engaging tool of the center toolbar to penetrate soil;
a second actuating cylinder extending between the center toolbar and the first inner-wing toolbar, wherein the second actuating cylinder is configured to apply a second down force to the first inner-wing toolbar to drive the at least one ground engaging tool of the first inner-wing toolbar to penetrate the soil;
a third actuating cylinder extending between the first inner-wing toolbar and the first outer-wing toolbar, wherein the third actuating cylinder is configured to apply a third down force to the first outer-wing toolbar to drive the at least one ground engaging tool of the first outer-wing toolbar to penetrate the soil; and
a control system configured to drive the first actuating cylinder, the second actuating cylinder, and the third actuating cylinder, such that the first down force is greater than the second down force, and the second down force is greater than the third down force.

2. The agricultural implement system of claim 1, comprising:
a second inner-wing toolbar rotatably coupled to the center toolbar on an opposite lateral side from the first inner-wing toolbar, the second inner-wing toolbar including at least one ground engaging tool; and
a fourth actuating cylinder extending between the center toolbar and the second inner-wing toolbar, wherein the fourth actuating cylinder is configured to apply a fourth down force to the second inner-wing toolbar to drive the at least one ground engaging tool of the second inner-wing toolbar to penetrate the soil.

3. The agricultural implement system of claim 2, comprising:
a second outer-wing toolbar rotatably coupled to the second inner-wing toolbar, the second outer-wing toolbar including at least one ground engaging tool; and
a fifth actuating cylinder extending between the second inner-wing toolbar and the second outer-wing toolbar, wherein the fifth actuating cylinder is configured to apply a fifth down force to the second outer-wing toolbar to drive the at least one ground engaging tool of the second outer-wing toolbar to penetrate the soil.

4. The agricultural implement system of claim 3, wherein the control system configured to drive the fourth actuating cylinder, and the fifth actuating cylinder, such that the first down force is greater than the fourth down force, and the fourth down force is greater than the fifth down force.

5. The agricultural implement system of claim 1, wherein:
the first actuating cylinder, the second actuating cylinder, and the third actuating cylinder are pneumatically or hydraulically operated; and
the control system comprises a flow control circuit configured to provide a first fluid pressure to the first actuating cylinder, to provide a second fluid pressure, less than the first fluid pressure, to the second actuating cylinder, and to provide a third fluid pressure, less than the second fluid pressure, to the third actuating cylinder.

6. The agricultural implement system of claim 5, wherein the flow control circuit facilitates independent adjustment of at least the second and third fluid pressures.

7. The agricultural implement system of claim 6, wherein the flow control circuit comprises a first pressure reducing relieving valve configured to adjust the second fluid pressure to the second actuating cylinder.

8. The agricultural implement system of claim 7, wherein the flow control circuit comprises a second pressure reducing relieving valve configured to adjust the third fluid pressure to the third actuating cylinder.

9. The agricultural implement system of claim 8, wherein the first and second pressure reducing relieving valves are configured to adjust the first and second fluid pressures such that the at least one ground engaging tool of the center tool bar, the at least one ground engaging tool of the first inner-wing toolbar, and the at least one ground engaging tool of the first outer-wing toolbar penetrate the soil with substantially equal contact forces.

10. An agricultural implement system, comprising:
a frame;
a storage tank connected to the frame, and configured to store a material;
a center toolbar connected to the frame, the center toolbar including at least one opener;
a first inner-wing toolbar and a second inner-wing toolbar pivotably connected to opposite ends of the center toolbar, and wherein the first and second inner-wing toolbars include at least one opener;
a first outer-wing toolbar and a second outer-wing toolbar pivotably connected to the respective first and second inner-wing toolbars, and wherein the first and second inner-wing toolbars include at least one opener; and
a first actuating cylinder, a second actuating cylinder, a third actuating cylinder, a fourth actuating cylinder, and a fifth actuating cylinder configured to apply a down force on the respective center toolbar, first inner-wing toolbar, second inner-wing toolbar, first outer-wing toolbar, and second outer-wing toolbar to drive the openers to penetrate the soil with substantially equal contact forces.

11. The crop production system of claim 10, wherein the first inner-wing toolbar, second inner-wing toolbar, first outer-wing toolbar, and second outer-wing toolbar include a respective gauge wheel.

12. The crop production system of claim 11, further comprising a flow control circuit to control a pressurized fluid configured to actuate the first actuating cylinder, the second actuating cylinder, the third actuating cylinder, the fourth actuating cylinder, and the fifth actuating cylinder, and wherein the fluid circuit varies the fluid pressure between the first, second, third, fourth, and fifth actuating cylinders.

13. The crop production system of claim 12, wherein the flow control circuit includes a first pressure reducing relieving valve configured to reduce pressure on the second and third actuating cylinders to a first pressure.

14. The crop production system of claim 13, wherein the flow control circuit includes a second pressure reducing relieving valve configured to reduce pressure on the fourth and fifth actuating cylinders to a second pressure and wherein the second pressure is less than the first pressure.

15. The crop production system of claim 10, wherein the crop production system is configured to move a material from the storage tank along the center toolbar, first inner-wing tool bar, second inner-wing tool bar, first outer-wing toolbar, and second outer-wing toolbar, and deposits the material behind the openers.

16. An agricultural implement system, comprising:
a center toolbar with at least one opener;
a first inner-wing toolbar and a second inner-wing toolbar pivotably connected to opposite ends of the center toolbar, and wherein the first and second inner-wing toolbars include at least one opener;
a first outer-wing toolbar and a second outer-wing toolbar pivotably connected to the respective first and second inner-wing toolbars, and wherein the first and second outer-wing toolbars include at least one opener;
a first actuating cylinder, a second actuating cylinder, a third actuating cylinder, a fourth actuating cylinder, and a fifth actuating cylinder configured to apply an adjustable down force on the respective center toolbar, first inner-wing toolbar, second inner-wing toolbar, first outer-wing toolbar, and second outer-wing toolbar to drive the openers into the soil; and
a fluid control circuit configured to control a downward force on the center toolbar, first inner-wing toolbar, second inner-wing toolbar, first outer-wing toolbar, and second outer-wing toolbar so that the openers penetrate the soil with substantially equal contact forces.

17. The down pressure control system of claim 16, wherein the fluid control circuit applies a first pressure to the center toolbar that is greater than the pressure applied to the first inner-wing toolbar, second inner-wing toolbar, first outer-wing toolbar, and second outer-wing toolbar.

18. The down pressure control system of claim 16, wherein the fluid control circuit applies a second pressure to the first and second inner-wing toolbars.

19. The down pressure control system of claim 16, wherein the fluid control circuit applies a third pressure to the first and second outer-wing toolbars.

20. The down pressure control system of claim 16, wherein the fluid control circuit includes at least one pressure reducing relieving valve.

* * * * *